United States Patent
Watanabe et al.

(10) Patent No.: US 6,639,736 B2
(45) Date of Patent: Oct. 28, 2003

(54) BASE PLATE, LENS SHEET, AND PROJECTION SCREEN

(75) Inventors: Hitomu Watanabe, Tokyo-to (JP); Makoto Kimura, Tokyo-to (JP); Ryuji Hashimoto, Tokyo-to (JP); Yasuhiro Doi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 92 days.

(21) Appl. No.: 10/023,003

(22) Filed: Dec. 17, 2001

(65) Prior Publication Data

US 2002/0171928 A1 Nov. 21, 2002

(30) Foreign Application Priority Data

Mar. 7, 2001 (JP) ......................................... 2001-062967

(51) Int. Cl.$^7$ ................................................ G02B 3/08
(52) U.S. Cl. ....................................... 359/742; 359/454
(58) Field of Search ............................... 359/642, 454, 359/742

(56) References Cited

U.S. PATENT DOCUMENTS 5,476,906 A * 12/1995 Yokoo et al. ................ 525/310
6,469,832 B2 * 10/2002 Yotsuya et al. .............. 359/619

* cited by examiner

*Primary Examiner*—Scott J. Sugarman
*Assistant Examiner*—Deborah Raizen
(74) *Attorney, Agent, or Firm*—Ladas & Parry

(57) ABSTRACT

Disclosed are a base plate for use for a lens sheet that can realize the unlikeliness to be cracked while the self-sustenance of the lens sheet is being maintained, the lens sheet, and a projection screen comprising that lens sheet. In a base plate, the base plate constructing a lens sheet as a base sheet for a UV-curable resin layer by being bonded to the UV-curable resin layer and being made of ductile materials, the breaking flexure by bending of the ductile material is 0.08 or more; and the Izod impact value thereof is 5 KJ/m$^2$ or more. Also, in a base plate consisting of fragile material, there is used a material that has respective physical properties wherein when it is assumed that F (MPa) represents the shearing force of the UV-curable resin; h (m) represents the thickness of the base plate; E (MPa) represents the bending modulus of elasticity of the fragile material; and ω (dimensionless quantity) represents the breaking flexure by bending, the relationship of $F/hE\omega < 1.5$ holds true.

6 Claims, 4 Drawing Sheets

CENTER OF FRESNEL LENS ←

CENTER OF FRESNEL LENS →

COATING BY APPLICATOR

LAMINATE SO THAT NO AIR MAY ENTER

CUT TO WIDTH OF 25 MM

EXFOLIATE THESE PORTIONS

CUT UNNECESSARY PORTIONS

CHACK OF TENSILE TESTER

CHACK OF TENSILE TESTER

BASE PLATE, LENS SHEET, AND PROJECTION SCREEN

BACKGROUND OF THE INVENTION

1. Field of the Invention

The present invention relates to a large-sized projection screen, a lens sheet that is suitably used therein, and a base plate that is used in that lens sheet.

2. Description of the Related Art

As illustrated in FIG. 1, a lens sheet 1 has hitherto been being manufactured through the following processes. Namely, a temperature adjustment process (A) for adjusting the temperature of a mold 2 of the lens sheet 1 to the temperature that is suitable for molding the lens. The first resin coating process (B) for coating a liquid state of ionizing radiation curable type resin (hereinafter referred to as "the UV-curable resin) 3 to the entire surface of the temperature-adjusted mold 2. The second resin coating process (C) for coating the liquid UV-curable resin 3 to the portion on the pressurization starting side that is located on the mold 2. The base plate supply process (D) for applying the base plate 4, which permits the transmission of ionizing radiation through itself, to the mold 2 from above the UV-curable resin 3. The lamination process (E) for pressing the base plate 4 by means of pressurizing rolls 5a, 5b from the pressurization starting end side to a pressurization termination end side to thereby laminate the base plate 4 onto the UV-curable resin 3. The resin-curing process (F) for radiating the ionizing radiation onto the UV-curable resin 3 from above the base plate 4 to thereby cure it. The mold-release process (G) for exfoliating the thus-cured UV-curable resin 3 from the mold 2 jointly with the base plate 4.

The base plate supply process (D) is the one that is intended to cover the base member 4 of the lens sheet 1 to the mold 2 from above the UV-curable resin 3. For example, the sheet-like base plate 4 is adsorbed by a plurality of suckers that are disposed on a flat plane and is conveyed onto the mold 2 having had coated thereon the UV-curable resin 3. The suckers release the base plate 4 at a position above the mold 2, whereby the base plate 4 falls upon the coated layer of the UV-curable resin 3 and is adhered onto the surface of the UV-curable resin 3.

The mold-release process (G) is for exfoliating the UV-curable resin 3, which has been cured by the radiation of ionizing radiation 7, from the mold 2 jointly with the base plate 4. The direction of exfoliation is based upon the following method. Namely, as illustrated in FIG. 2A, in the Fresnel-lens-configuration imparted surface of the mold 2, the lens formation grooves are formed as acute concavities/convexities. Therefore, when simply attempting to grip one side or one corner of the base plate 4 and to exfoliate the base plate 4 towards the opposite side, as illustrated in FIG. 2B the exfoliation goes beyond the center of the Fresnel lens and proceeds towards the opposite side. And the concavities/convexities of the Fresnel lens that are formed in the UV-curable resin 3 are caught and damaged. Resultantly, the Fresnel lens becomes likely to have a degraded performance as a lens. The reference symbol 16 represents the damaged portions of the lens. Therefore, the exfoliation of the lens sheet 1 from the mold 2 is done in the way the exfoliation goes on from the peripheral part towards the center portion.

This mold-release process (G) is executed in accordance with the following procedure in view of the knowledge that has been mentioned above.

As illustrated in FIG. 3, first, in a state where a central part 4a of the base plate 4 is pressed against the mold 2, a pair of diametric portions 4b, 4d are gripped and the base plate 4 is thereby lifted upward from the mold 2. A pair of the diametric portions 4b, 4d are simultaneously or alternately lifted up. As a result of this, from these diametric portions 4b, 4d and the neighborhood towards the center of the lens, the UV-curable resin 3 is exfoliated from the upper surface of the mold 2. Next, after the base plate 4 in the neighborhoods of the diametric portions 4b, 4d is once lowered onto the mold 2, another pair of diametric portions 4c, 4e are gripped and the base plate 4 is lifted upward from the mold 2. This second pair of the diametric portions 4c, 4e are also simultaneously or alternately lifted up. As a result of this, from these diametric portions 4c, 4e and the neighborhood towards the center of the lens, the UV-curable resin 3 is exfoliated from the upper surface of the mold 2. At the final stage, in a state where the central part 4a of the base plate 4 is pressed downward, all of the diametric portions 4b, 4c, 4d, and 4e are gripped and are thereby lifted up jointly and simultaneously with the pressing of the central part 4a. Thereby, the UV-curable resin 3 is completely exfoliated from the mold 2.

The lens sheet 1 that has been finished through the above-described processes is in the shape wherein the UV-curable resin layer 3 is bonded to the base plate 4.

In the projection screen, the self-sustenance of the lens is ensured through the mechanical strength of the lens sheet. As described above, the base plate 4 that has been used for manufacturing the lens sheet 1 constructs most part of the thickness of the lens sheet 1. Therefore, it has been demanded to maintain the mechanical strength of the lens sheet per se through the use of that portion.

By the way, as the projection screen goes on becoming large-sized, there has been a demand to reduce the weight, to save the resource materials, etc. of the lens sheet 1 per se and the base plate 4 and hence to make small the thickness thereof while making the area thereof large. Concretely, while the thickness of the base plate 4 that corresponds to a large-sized screen of 40 to 80 inches was conventionally to an extent of 3 mm or so, nowadays it has been demanded to make it a thickness of 1 mm or so. Ordinarily, as the method for, even when making that thickness small in that way, ensuring the self-sustenance of the lens sheet 1, it is considered as being advisable to increase the rigidity of the material of the base plate.

However, there is the problem that when increasing the rigidity of the material that material conversely becomes fragile and likely to crack. Namely, since in the above-described mold-release process (G) the base plate 4 receives a great magnitude of stress, the fragile material becomes likely to crack although it is hard. Correspondingly to this, when manufacturing the base plate with the use of a material that is unlikely to crack, the rigidity of that material decreases. Resultantly, the self-sustenance is impaired. There was therefore the problem of the so-called "antinomy".

SUMMARY OF THE INVENTION

Thereupon, the present invention has an object to provide a base plate for use for a lens sheet that can realize the unlikeliness to crack while ensuring the self-sustenance, a lens sheet that uses that base plate, and a projection screen that is equipped with that lens sheet.

Hereinafter, the present invention will be explained.

In one aspect of the present invention, the above-described problems are solved by abase plate, the base plate constructing a lens sheet as a base sheet for a UV-curable resin layer by being bonded to the UV-curable resin layer and being made of the ductile material, wherein the breaking flexure by bending of the ductile material is 0.08 or more; and the Izod impact value thereof is 5 KJ/m² or more. Also, in another aspect of the present invention equipped with the above-described aspect, the above-described problems are solved by a lens sheet comprising the above-described base plate as well as a projection screen comprising the lens sheet that is described above. Here, the "ductile material" is referred to as a material having a synthetic resin material having mixed therein a prescribed amount of rubber quality of material such as butadiene, including, for example, "HT" (impact resistance methacrylic resin) and "MBS" (methacrylate/butadiene/styrene copolymer resin).

If such is done as such, even when using the ductile material as the material of the base plate, it is possible to realize the unlikeliness to crack while ensuring the self-sustenance of the lens.

In the above-described aspect, the thickness of the base plate may be 1 mm or less; and the bending modulus of elasticity of the material of the base plate may be 2000 MPa or more.

If such is done as such, even when making the thickness of the base plate constructed of the ductile material 1 mm or less, it is possible to realize the unlikeliness to crack while ensuring the self-sustenance of the lens.

In a third aspect of the present invention, the above-described problems are solved by a base plate, the base plate constructing a lens sheet as a base sheet for a UV-curable resin layer by being bonded to the UV-curable resin layer and being made of fragile materials, wherein, when it is assumed that F (MPa) represents the shearing force of the UV-curable resin; h (m) represents the thickness of the base plate; E (MPa) represents the bending modulus of elasticity of the fragile material; an ω (dimensionless quantity) represents the breaking flexure by bending, the relationship of F/hEω<1.5 holds true. Also, in other aspects of the present invention equipped with that aspect, the above-described problems are solved by a lens sheet comprising the above-described base plate as well as a projection screen comprising the lens sheet that is described above. Here, the "fragile material" is referred to as a material the Izod impact value of that is below 3.5 kJ/m², such as, for example, "PS" (general use polystyrene resin), "PMMA" (general use polymethylmethacrylateresin), and "MS" (styrene/methacrylate/methyl copolymer resin).

If such is done as such, even when constructing the base plate by the use of the fragile material, it is possible to realize the unlikeliness to crack while ensuring the self-sustenance of the lens.

In the above-described aspect, the thickness of the base plate may be 1 mm or less; and the bending modulus of elasticity of the material of the base plate may be 2000 MPa or more.

If such is done as such, even when making the thickness of the base plate constructed of the fragile material 1 mm or less, it is possible to realize the unlikeliness to crack while ensuring the self-sustenance of the lens.

The above-described functions and advantages of the present invention will become apparent from the embodiments that will be explained next.

DESCRIPTION OF THE PREFERRED EMBODIMENTS

The present invention will hereafter be explained based on its embodiments.

Regarding all combinations of four kinds of UV-curable resins A to D that are different from one another in terms of the shearing force and three stages of base plate thickness of 1.0 mm, 2.0 mm, and 3.0 mm, mold-release test was conducted on each of them.

The results of the mold-release tests are shown in Table 1. In Table 1, as the "HT" there was used an impact-resisting methacrylic resin, especially here the resin "HT018" in the series "Sumipex HT" produced by Sumitomo Chemical Co., Ltd. The "MBS" represents a methacrylate/butadiene/stylene copolymer resin and, here, there was used the resin "SX100" produced by Asahi Kasei Corporation. The "PS" and "PMMA" represent general-use polystylene resin and general-use polymethylmethacrylate resin, respectively. The "MS" represents stylene methacrylate copolymer resin and, here, there was used the resin "MS-300" in the series "Estylene MS" produced by Nippon Steel Chemical Co., Ltd. In each of the "HT" and "MBS" there is mixed a prescribed amount of rubber component (butadiene) for the purpose of increasing the resistance to impact. Also, the mark "○" indicates that the release of the mold has been well done while the mark "X" indicates that during the release of the mold the base plate has been cracked.

Figure 1A:
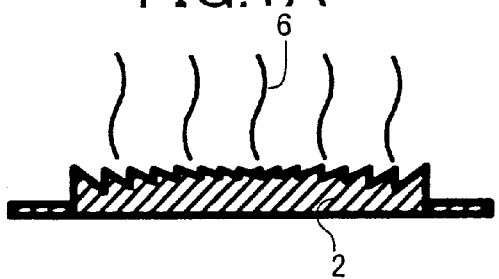
FIGS. 1A to 1G are explanatory views each illustrating a method of manufacturing a lens sheet in order of the processes.
Figure 1E:
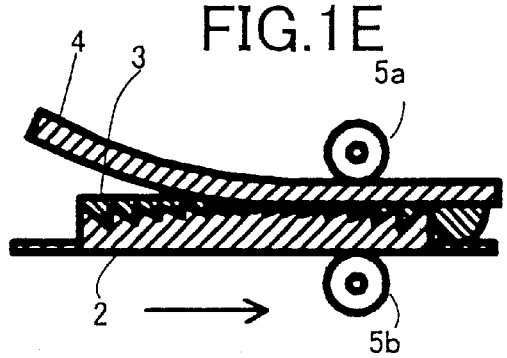
Figure 1B:
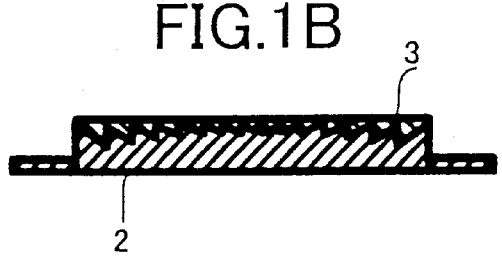
Figure 1F:
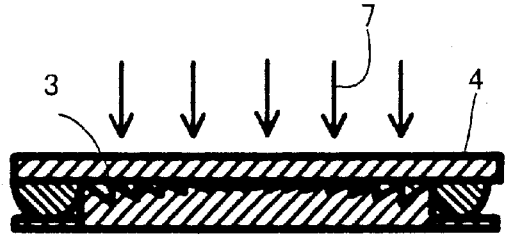
Figure 1C:
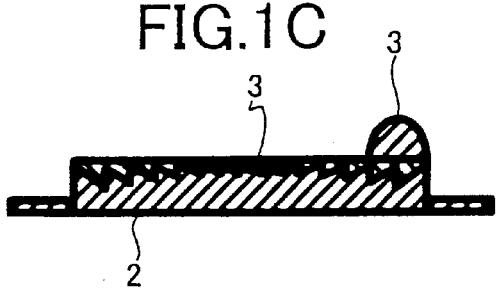
Figure 1G:
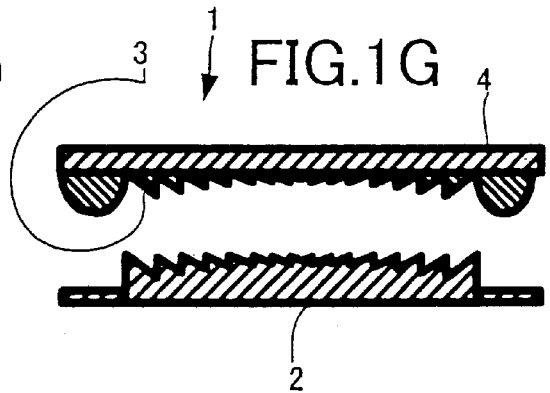
Figure 1D:
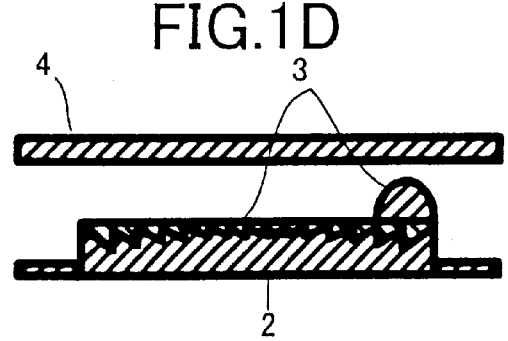
Figure 2A:
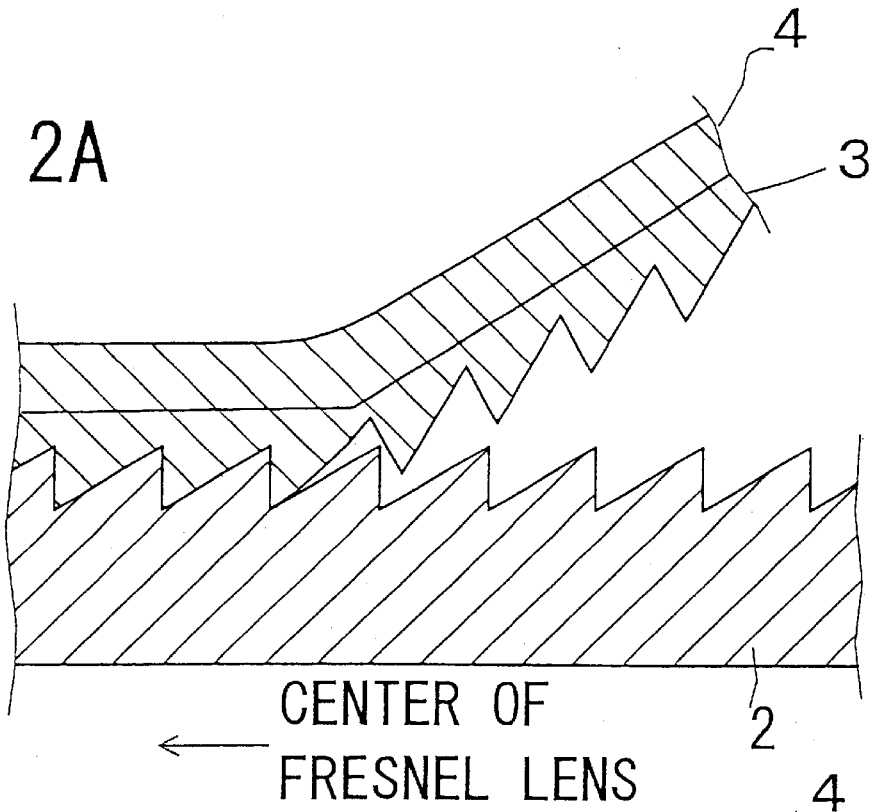
FIG. 2A is a type view illustrating a state where a lens sheet is appropriately exfoliated from its relevant mold.
Figure 2B:
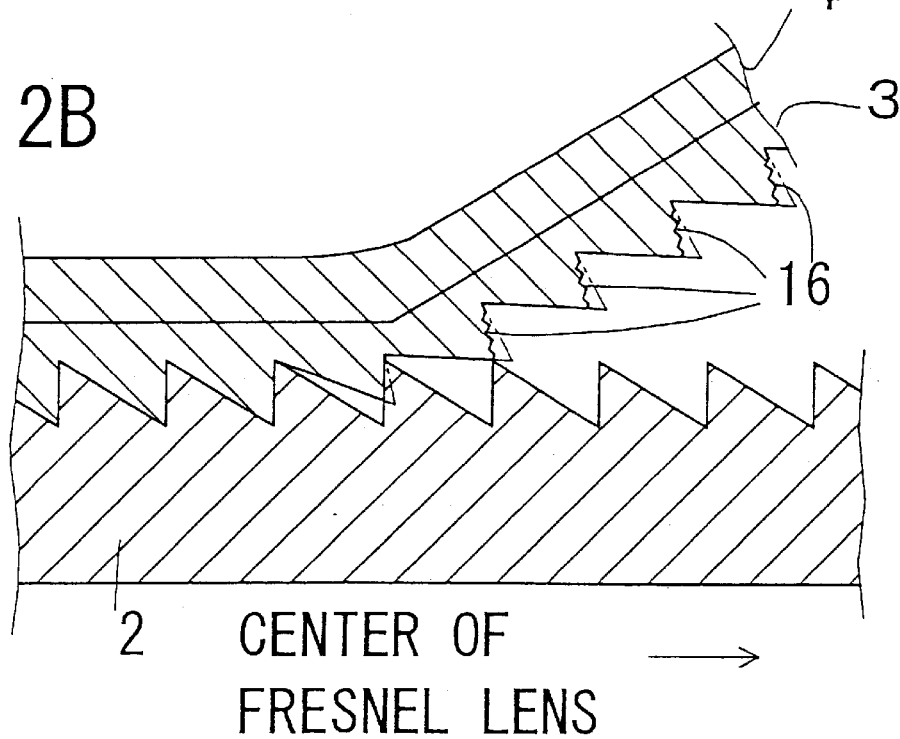
FIG. 2B is a type view illustrating a state where flaws occur when exfoliating the lens sheet from the mold.
Figure 3:
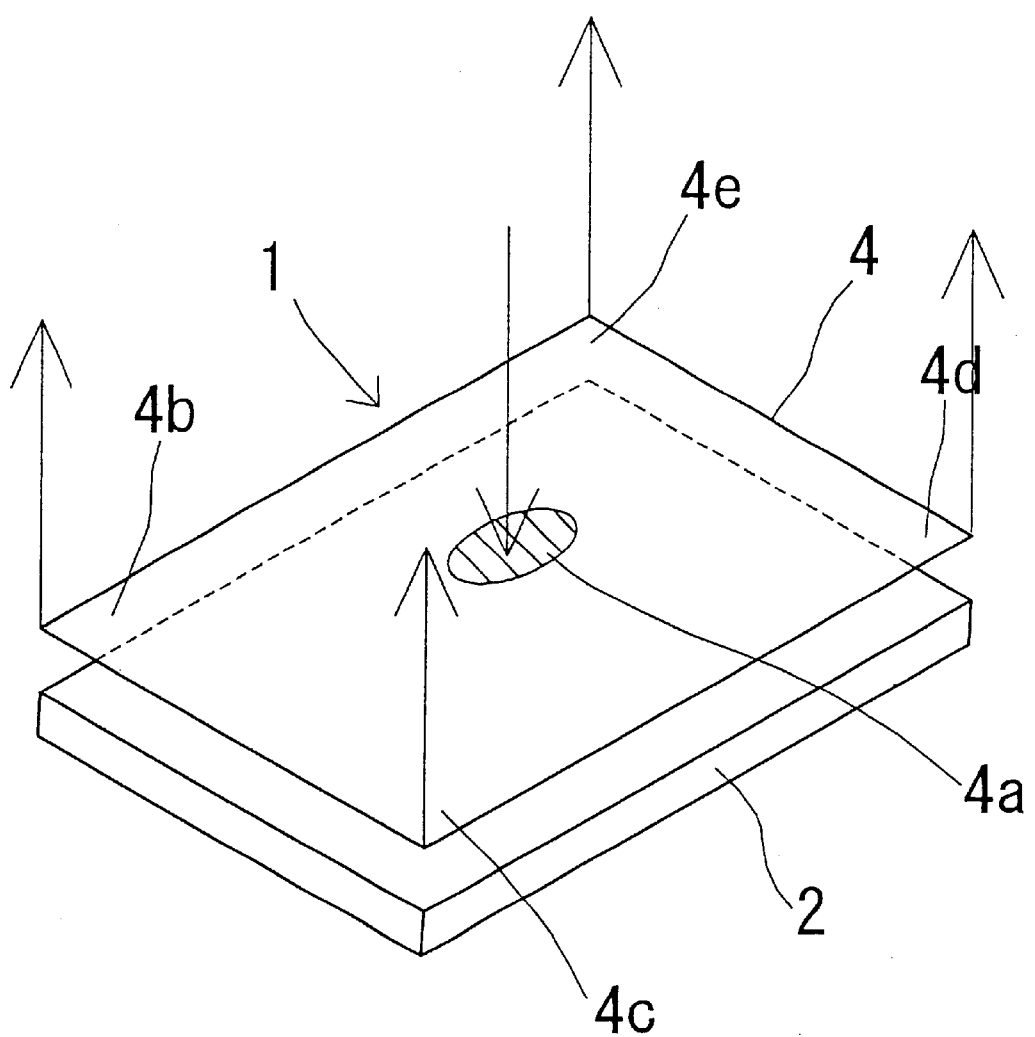
FIG. 3 is a perspective view illustrating a method of exfoliating the lens sheet from the mold.
Figure 4A:
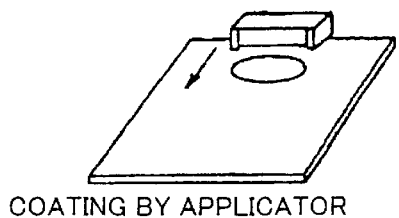
FIGS. 4A to 4F are views each illustrating a method of measuring the shearing force of the UV-curable resin.
Figure 4B:
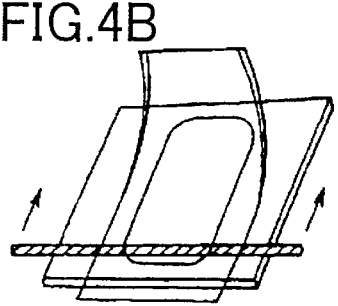
Figure 4C:
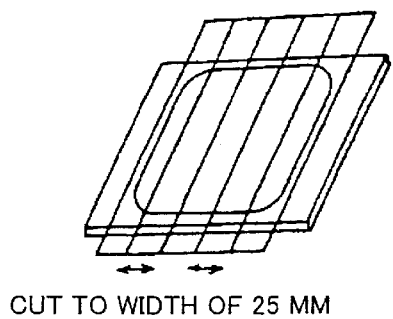
Figure 4D:
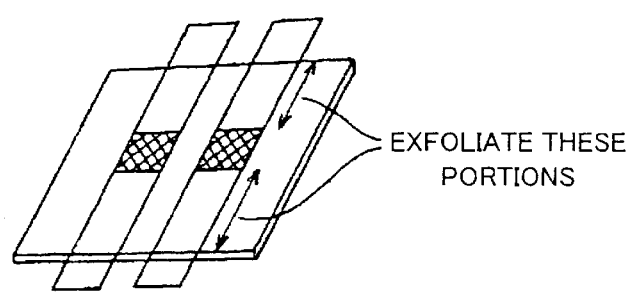
Figure 4E:
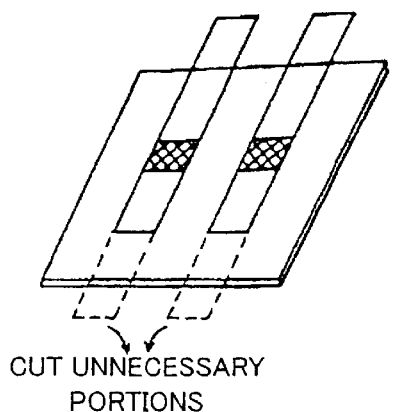
Figure 4F:
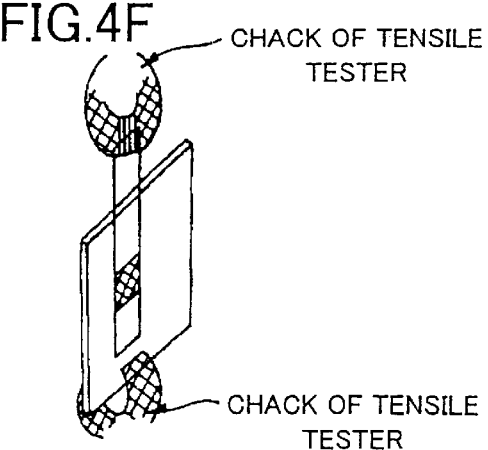

A method of measuring the shearing force of the UV-curable resins will now be explained while referring to FIGS. 4A to 4F. First, UV-curable resin is coated using a flat die plated on its surface with nickel or chrome by an applicator to a thickness of 130 μm or so (FIG. 4A). Next, an easily adherable PET film (A-400 produced by Toyobo Co., Ltd. the thickness: 125 μm) is laminated on the surface part of the coating (FIG. 4B). The UV-curable resin is cured as is. Then, a cut is made correspondingly to a width of 25 mm (FIG. 4C). At this time, the portions other than those each having a width of 25 mm are exfoliated. Subsequently, with those portions of the 25-mm width sample each having a height of 25 mm being left as they are, the remaining portions are exfoliated (FIG. 4D). Further, those unnecessary portions of the PET films are cut away (FIG. 4E) Thereafter, using a tensile tester, the added weight is measured under the conditions that the pulling speed is 50 mm/min. (FIG. 4F) This measured added weight is divided by 6.25 (2.5×2.5). This quotient is used as a value that represents the shearing force. Here, the unit of it is (MPa).

Also, the physical properties of the respective base plate materials that have been evaluated are shown in Table 2. In the present entire specification including Table 2, the bending strength, the bending modulus of elasticity, and the breaking flexure by bending are the ones that have been obtained by performing the measurement through the use of a testing method that is stated in JIS-K-7203 (the method of the bending test on hard plastic). The Izod impact value is the one that has been obtained by performing the measurement through the use of a testing method that is stated in JIS-K-7110 (the method of the Izod impact test on hard plastic).

The inventors of this application reviewed and studied the physical properties of the UV-curable resin and base plate materials and, as for the ductile materials such as "HT" and "MBS", directed their attention to the breaking flexure by bending and the Izod impact value. As a result, they have found out that if the breaking flexure by bending is 0.08 or more and the Izod impact value is 5 KJ/m² or more, during the mold-release process no cracks occur while the self-sustenance of the base plate is being maintained. Further, they, as for the fragile materials such as "PS", "PMMA", "MS", etc., directed their attention to the respective quantities of the UV-curable resin shearing force F (MPa), base plate thickness h (m), fragile-material bending elasticity modulus E (MPa), and breaking flexure ω by bending (dimensionless quantity). They as a result have found out that if the relationship of F/hEω<1.5 holds true among them, during the mold-release process approximately no cracks occur while the self-sustenance of the base plate is being maintained. Just for reference, the calculated results of the values of (F/hEω) in a case where three kinds of thickness values for each of various kinds of UV-curable resins are combined with two kinds of the ductile materials and three kinds of the fragile materials are shown in Table 3.

As is clear from Tables 1 and 3, of the combinations of the fragile materials (PS, PMMA, and MS) wherein the relationship of F/hEω<1.5 holds true, the one wherein any cracks occurred during the mold-release process is only the combination comprised of the UV-curable resin: "C", base plate thickness: 2 mm, and base plate material: "PS". Therefore, it is seen that if that relationship substantially holds true no cracks occur during the mold-release process.

Further, the inventors of this application already confirm that in case the thickness of the base plate is 1 mm or less the self-sustenance of the lens sheet is ensured if the bending modulus of elasticity is 2000 MPa or more.

In the foregoing description, there has been explained the case where the invention of this application has been applied to the Fresnel lens sheet. But, the present invention is not limited to it but can also be applied to other kinds of lens sheets such as a lenticular lens sheet, a fly-eye lens sheet, etc.

Further, the present invention is not limited to the above-described embodiments but permits suitable changes or modifications to be made without departing from the subject matter or idea of the invention that is readable from the scope of the claims and the entire specification. A base plate for use for a lens sheet, the lens sheet, a projection screen, and a method for molding resin for the lens sheet, each involving such changes or modifications, are also included within the technical scope of the present invention.

As has been explained above, according to an base plate, the base plate constructing a lens sheet as a base sheet for a UV-curable resin layer by being bonded to the UV-curable resin layer and being made of ductile materials, wherein the breaking flexure by bending of the ductile material is 0.08 or more; and the Izod impact value thereof is 5 KJ/m² or more, even if using the ductile materials as the material of the base plate, it is possible to realize the unlikeliness to crack while ensuring the self-sustenance of the lens.

In the above-described mode of invention, if assuming that the thickness thereof be 1 mm or less; and the bending modulus of elasticity of the material constituting it be 2000 MPa or more, even when making 1 mm or less the thickness of the base plate constructed of the ductile material, it is possible to realize the unlikeliness to crack while ensuring the self-sustenance of the lens.

Also, according to a base plate, the base plate constructing a lens sheet as a base sheet for a UV-curable resin layer by being bonded to the UV-curable resin layer and being made of fragile materials, wherein, when it is assumed that F (MPa) represents the shearing force of the UV-curable resin; h (m) represents the thickness of the base plate; E (MPa) represents the bending modulus of elasticity of the fragile material; and ω (dimensionless quantity) represents the breaking flexure by bending, the relationship of F/hEω<1.5 holds true, even when constructing the base plate with the use of the fragile material, it is possible to realize the unlikeliness to crack while ensuring the self-sustenance of the lens.

In the above-described mode of invention, if assuming that the thickness thereof be 1 mm or less; and the bending modulus of elasticity of the material constituting it be 2000 MPa or more, even when making 1 mm or less the thickness of the base plate constructed of the fragile material, it is possible to realize the unlikeliness to crack while ensuring the self-sustenance of the lens.

TABLE 1

| Names of UV-curable resins s | UV-curable resin shearing force (MPa) | Thickness of base plate (m) | HT | MBS | PS | PMMA | MS |
|---|---|---|---|---|---|---|---|
| A | $6.82 \times 10^{-2}$ | $1 \times 10^{-3}$ | ◯ | ◯ | ◯ | ◯ | ◯ |
|  |  | $2 \times 10^{-3}$ | ◯ | ◯ | ◯ | ◯ | ◯ |
|  |  | $3 \times 10^{-3}$ | ◯ | ◯ | ◯ | ◯ | ◯ |
| B | $13.79 \times 10^{-2}$ | $1 \times 10^{-3}$ | ◯ | ◯ | ◯ | ◯ | ◯ |
|  |  | $2 \times 10^{-3}$ | ◯ | ◯ | ◯ | ◯ | ◯ |
|  |  | $3 \times 10^{-3}$ | ◯ | ◯ | ◯ | ◯ | ◯ |
| C | $30.09 \times 10^{-2}$ | $1 \times 10^{-3}$ | ◯ | ◯ | X | ◯ | ◯ |
|  |  | $2 \times 10^{-3}$ | ◯ | ◯ | X | ◯ | ◯ |
|  |  | $3 \times 10^{-3}$ | ◯ | ◯ | ◯ | ◯ | ◯ |
| D | $50.16 \times 10^{-2}$ | $1 \times 10^{-3}$ | ◯ | ◯ | X | X | X |
|  |  | $2 \times 10^{-3}$ | ◯ | ◯ | X | ◯ | ◯ |
|  |  | $3 \times 10^{-3}$ | ◯ | ◯ | ◯ | ◯ | ◯ |

TABLE 2

|  | Unit | HT | MBS | PS | PMMA | MS |
|---|---|---|---|---|---|---|
| Bending strength | MPa | 95 | 72 | 115 | 120 | 105 |
| Bending modulus of elasticity | MPa | 2300 | 2550 | 3430 | 3130 | 3230 |
| breaking flexure by bending | — | 0.08 or more | 0.08 or more | 0.05 | 0.06 | 0.06 |
| Izod impact value | Kj/m² | 8.0 | 7.4 | 1.2 | 2 | 2.5 |

TABLE 3

| Names of UV-curable resins s | UV-curable resin shearing force (MPa) | Thickness of base plate (m) | F/hEω |  |  |  |  |
|---|---|---|---|---|---|---|---|
|  |  |  | HT | MBS | PS | PMMA | MS |
| A | $6.82 \times 10^{-2}$ | $1 \times 10^{-3}$ | 0.37 | 0.33 | 0.40 | 0.36 | 0.35 |
|  |  | $2 \times 10^{-3}$ | 0.19 | 0.17 | 0.20 | 0.18 | 0.18 |
|  |  | $3 \times 10^{-3}$ | 0.12 | 0.11 | 0.13 | 0.12 | 0.12 |
| B | $13.79 \times 10^{-2}$ | $1 \times 10^{-3}$ | 0.75 | 0.68 | 0.80 | 0.73 | 0.71 |
|  |  | $2 \times 10^{-3}$ | 0.37 | 0.34 | 0.40 | 0.37 | 0.36 |
|  |  | $3 \times 10^{-3}$ | 0.25 | 0.23 | 0.27 | 0.24 | 0.14 |
| C | $30.09 \times 10^{-2}$ | $1 \times 10^{-3}$ | 1.64 | 1.48 | 1.75 | 1.60 | 1.55 |
|  |  | $2 \times 10^{-3}$ | 0.82 | 0.74 | 0.88 | 0.80 | 0.78 |
|  |  | $3 \times 10^{-3}$ | 0.55 | 0.49 | 0.58 | 0.53 | 0.52 |

TABLE 3-continued

| Names of UV-curable resins | UV-curable resin shearing force (MPa) | Thickness of base plate (m) | F/hEω | | | | |
|---|---|---|---|---|---|---|---|
| | | | HT | MBS | PS | PMMA | MS |
| D | $50.16 \times 10^{-2}$ | $1 \times 10^{-3}$ | 2.73 | 2.46 | 2.92 | 2.67 | 2.59 |
| | | $2 \times 10^{-3}$ | 1.36 | 1.23 | 1.46 | 1.34 | 1.29 |
| | | $3 \times 10^{-3}$ | 0.91 | 0.82 | 0.97 | 0.89 | 0.86 |

What is claimed is:

1. A base plate, the base plate constructing a lens sheet as a base sheet for a UV-curable resin layer by being bonded to the UV-curable resin layer and being made of a ductile material, wherein the breaking flexure by bending of the ductile material is 0.08 or more; and the Izod impact value thereof is 5 KJ/m² or more.

2. A base plate according to claim 1, wherein a thickness thereof is 1 mm or less; and a bending modulus of elasticity of the material constituting it is 2000 MPa or more.

3. A base plate, the base plate constructing a lens sheet as a base sheet for a UV-curable resin layer by being bonded to the UV-curable resin layer and being made of a fragile material, wherein, when it is assumed that F (MPa) represents a shearing force of the UV-curable resin; h (m) represents a thickness of the base plate; E (MPa) represents a bending modulus of elasticity of the fragile material; and ω (dimensionless quantity) represents a breaking flexure by bending, a relationship of F/hEω<1.5 holds true.

4. A base plate, the base plate constructing a lens sheet as a base sheet for a UV-curable resin layer by being bonded to the UV-curable resin layer and being made of a fragile material, wherein, when it is assumed that F (MPa) represents a shearing force of the UV-curable resin; E (MPa) represents a bending modulus of elasticity of the fragile material; and ω (dimensionless quantity) represents a breaking flexure by bending, a relationship of F/Eω<1.5 holds true, and a thickness is 1 mm or less; and a bending modulus of elasticity of the material is 2000 MPa or more.

5. A lens sheet comprising the base plate as described in any one of claims 1 to 4.

6. A projection screen comprising the lens sheet as described in claim 5.

* * * * *